United States Patent [19]

Lichti

[11] 4,333,195
[45] Jun. 8, 1982

[54] FIRE PROTECTIVE WALKWAY APPARATUS

[76] Inventor: Robert D. Lichti, 3318 Warwood Rd., Lakewood, Calif. 90712

[21] Appl. No.: 209,709

[22] Filed: Nov. 24, 1980

[51] Int. Cl.³ ............................................... E01D 1/00
[52] U.S. Cl. .................................. 14/71.5; 52/173 DS
[58] Field of Search ........................ 14/71.5; 135/5 R; 52/173 DS

[56] References Cited

U.S. PATENT DOCUMENTS

| | | | |
|---|---|---|---|
| 2,704,574 | 3/1955 | Etlar | 52/173 DS |
| 3,099,847 | 8/1963 | Lodjic | 14/71.5 |
| 3,538,655 | 11/1970 | Frommelt | 52/173 DS |
| 3,541,626 | 11/1970 | Eggert | 14/71.5 |
| 3,713,183 | 1/1973 | Belisle | 14/71.5 |
| 3,772,839 | 11/1973 | Timbers | 52/173 DS |
| 3,816,867 | 6/1974 | Shirzad | 14/71.5 |
| 4,120,067 | 10/1978 | Hone | 14/71.5 |

Primary Examiner—Nile C. Byers, Jr.
Attorney, Agent, or Firm—Fulwider, Patton, Rieber, Lee & Utecht

[57] ABSTRACT

There is disclosed an airplane passenger loading ramp defining a walkway having a cab at the free extremity thereof which includes a weather protective mating device for mating with the contour of an airplane around the entry door thereof. A generally tubular shaped fire protective shroud surrounds such sealing device and is connected on one end with the walkway around the exterior of such sealing device and has the opposite extremity thereof extendable telescopically over such sealing device to mate with the contour of such airplane. An operator is mounted on one end from the walkway and carries on the free extremity thereof of the free end of such shroud for selective extension of such shroud from a retracted position to an extended position mating with the airplane contour.

12 Claims, 8 Drawing Figures

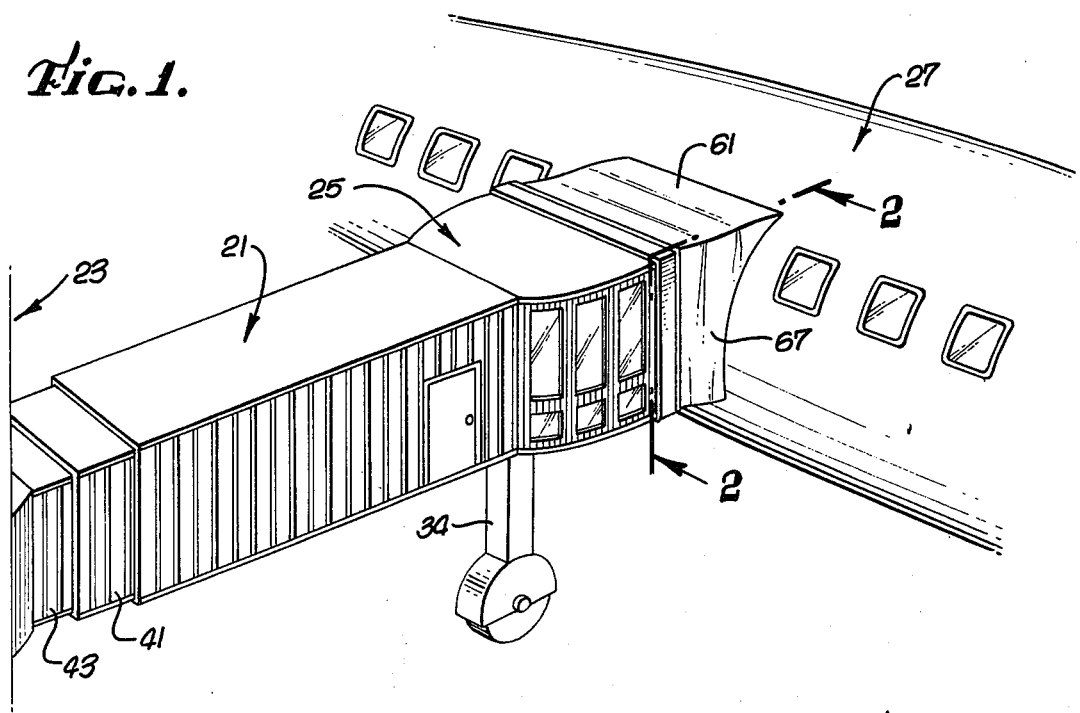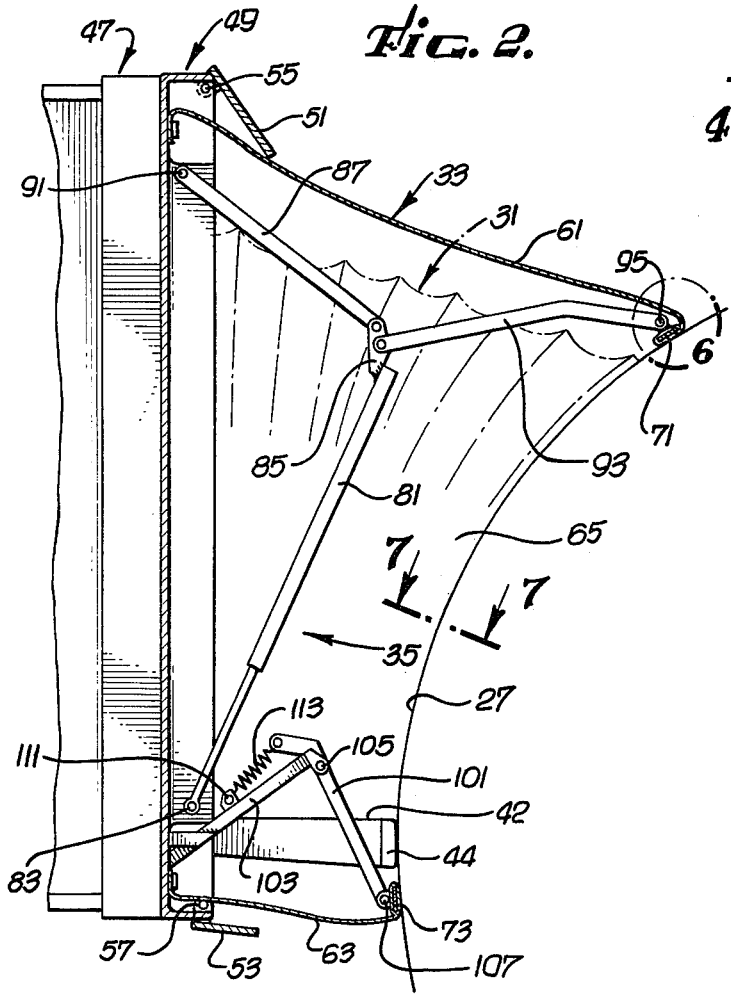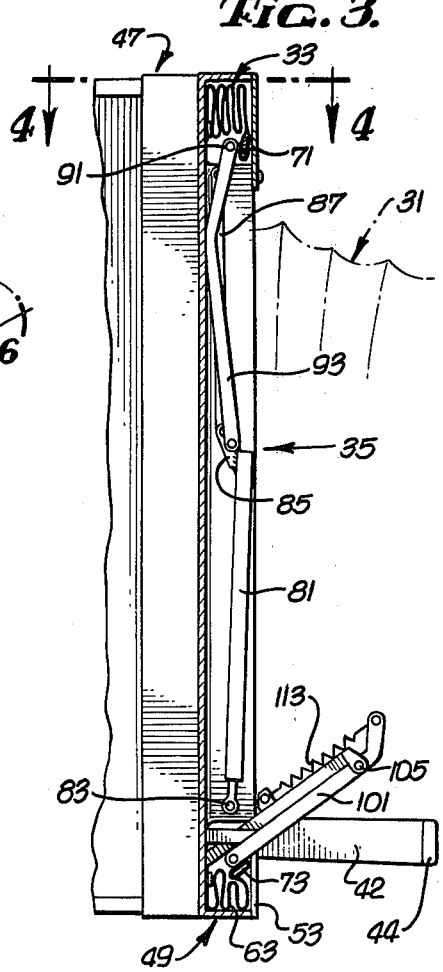

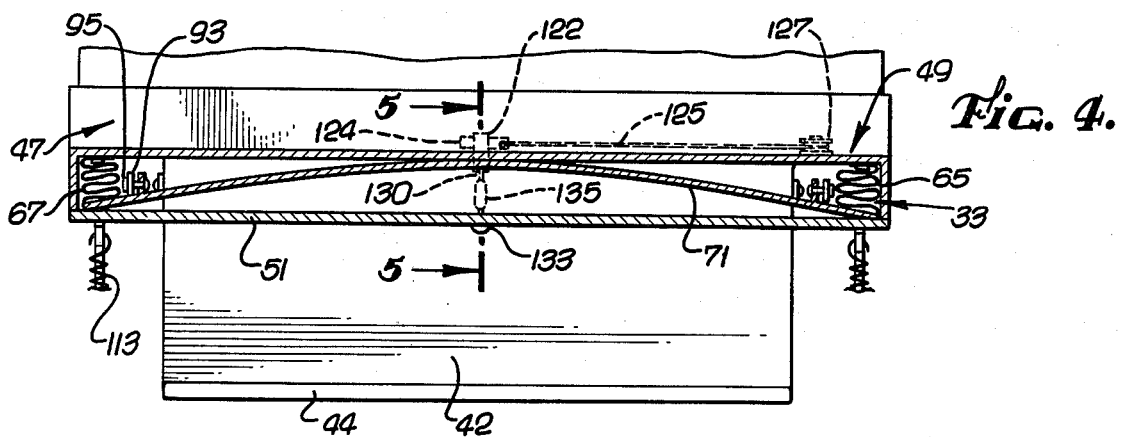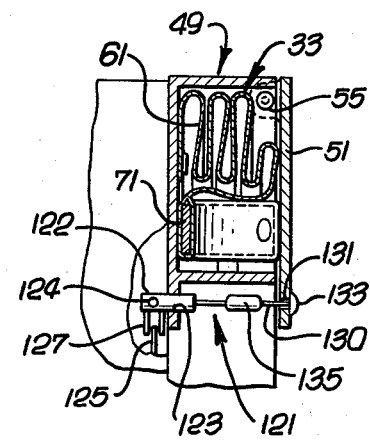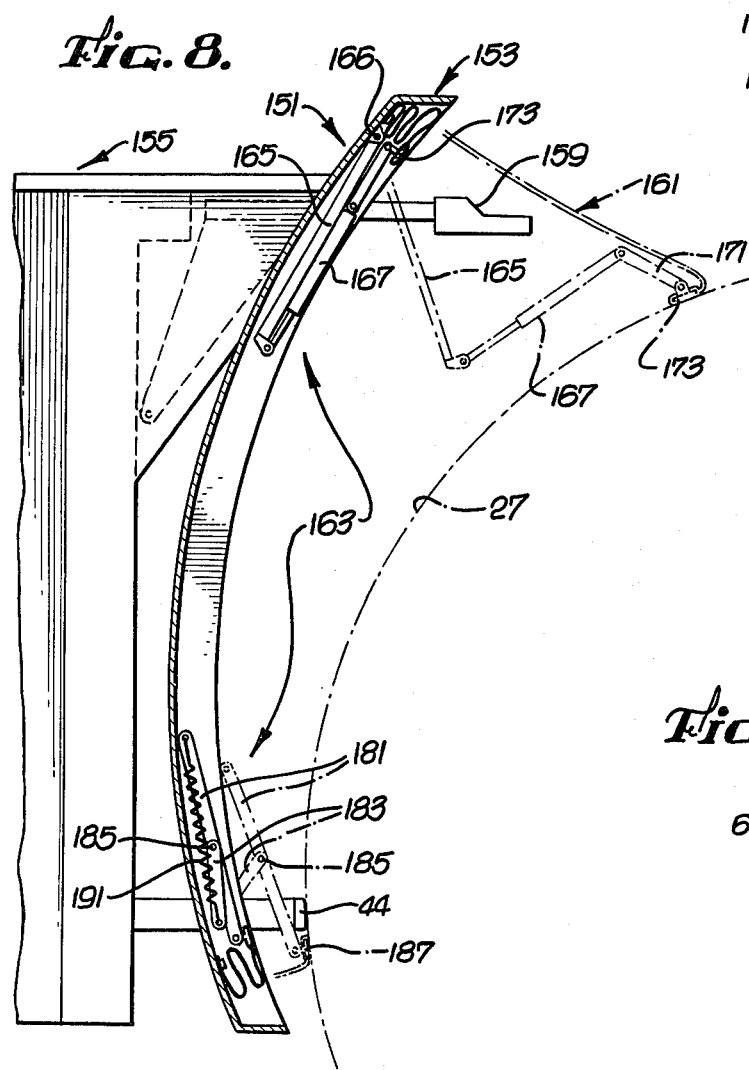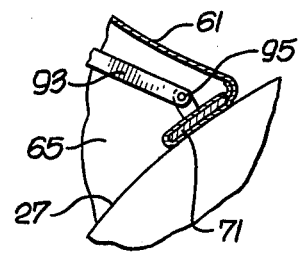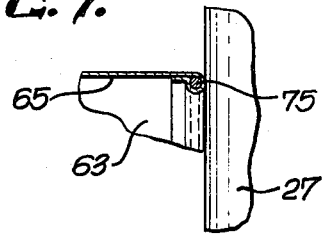

FIRE PROTECTIVE WALKWAY APPARATUS

BACKGROUND OF THE INVENTION

1. Field of the Invention

The present invention relates to airplane passenger loading ramps and, more particularly, to fire prevention devices incorporated in airplane loading ramps.

2. Description of the Prior Art

With the advent of modern day aircraft incorporating numerous different models having a variety of contours and shapes, it has been found desirable to utilize covered passenger loading ramps extending from the airplane terminal and incorporating on the free extremity thereof, a weather protective mating device frequently in the form of an accordion style seal. To protect the safety of passengers being loaded and unloaded from such airplanes, it is desirable that the walkway be sealed against the contour of the aircraft by a fire protective means which would, for some specified period of time after break out of a fire, protect the interior of such walkway from the fire located beneath or around such walkway. Typically, the weather protective mating devices themselves have incorporated fire protective curtains, canopies, floors, or shrouds which are intended to mate with the contour of the aircraft to provide a fire resistant seal. While such an arrangement may provide adequate protection when the sealing device is relatively new and unworn, after numerous operations in loading and unloading airplanes, the weather protective mating device may become worn or partially inoperative and may not form a secure seal with the contour of the aircraft. Consequently, at the very time when fire protection is needed to prevent injury and even death to passengers trapped on board an airplane at its loading ramp, the weather protective seal may be inoperative to provide the necessary protection to the passengers.

Many of the loading ramps now in use incorporate a cab on the free end thereof which may have a portion of the floor cut away for accommodating relative vertical movement of the airplane's forward entry door with respect to the floor of the cab to thus prevent damage to the forward entry door. In prior art walkway devices, such cutaways are not covered and provide a dangerous opening for entry of flames and fire from a fuel spill below the walkway thus exposing the passengers to severe danger of injury and death.

SUMMARY OF THE INVENTION

The fire protective walkway apparatus of the present invention is characterized by a protective shroud including a sheet for underlying the floor of the walkway adjacent the aircraft and which is normally stored in a collapsed position. The shroud is selectively releasable to extend such sheet in covering relationship under the walkway to seal against the airplane and protect passengers within such walkway from heat and fire rising upwardly from the ground beneath the airplane or surrounding area.

These and other features of the invention will become apparent from a consideration of the following detailed description of the drawings.

BRIEF DESCRIPTION OF THE DRAWINGS

FIG. 1 is a perspective view of a fire protective walkway apparatus of the present invention shown mated against the side of an airplane fuselage;

FIG. 2 is a transverse sectional view, in enlarged scale, taken along the line 2—2 of FIG. 1;

FIG. 3 is a sectional view similar to FIG. 2 but showing the fire protective shroud in its retracted position;

FIG. 4 is a sectional view similar to FIG. 3 but taken adjacent the sidewall of the shroud;

FIG. 5 is a sectional view taken along the line 5—5 of FIG. 4;

FIG. 6 is a detailed view in enlarged scale, taken from the circle designated 6 in FIG. 2;

FIG. 7 is a sectional view, in enlarged scale, taken along the line 7—7 of FIG. 2; and, FIG. 8 is a transverse sectional view of a second embodiment of the fire protective walkway apparatus embodying the present invention.

DETAILED DESCRIPTION OF THE PREFERRED EMBODIMENTS

Referring to FIGS. 1 and 2 it is, generally speaking, common practice to install a covered ramp or walkway 21 leading from an airplane terminal 23 and mounting a cab 25 on the free end thereof for selective mating with the side of an airplane fuselage 27 to insure mating with different models of aircraft having different overall contours around the entry doors. Such cabs 25 typically mount on the open side thereof, a generally tubular accordion style weather protective mating device generally designated 31, which may be selectively extended from a retracted position to an extended position to form a border seal with the side of the aircraft around the entry door opening. The fire protective walkway apparatus of the present invention includes a generally rectangular in-cross-section tubular shaped shroud, generally designated 33, which is normally maintained in a retracted position shown in FIG. 3 and may be selectively extended by means of an operator, generally designated 35 (FIG. 2) to envelop the entire periphery of the weather protective mating device 31 and itself seal against the contour of the aircraft 27 to fully protect the mating device 31 against flames and heat generated by a fire located beneath the walkway 21 or in any surrounding area.

It has been common practice to construct the weather protective mating devices 31 of a fire resistant material to thus provide some degree of passenger protection from fire and heat exterior of the walkway 21. However, such weather protective mating devices 31 may be, on occasion, extended and retracted 40 or 50 times during any one busy 24 hour period thus leading to a relatively short service life during which time perfect sealing with the aircraft can be assured. Not only does such wear and tear result in failure of the weather protective mating device 31 to provide adequate protection against fire and heat but on occasion, particularly during pleasant weather, the workmen operating the walkway 21 may neglect to extend the weather protective mating device 31 for secure contact with the airplane 27 or may inadvertently fail to bring such walkway 21 into position where secure contact may be made. Consequently, while the fire protective capability of the weather sealing device 31 may be adequate for new installations and under perfect conditions, such device itself may be inoperative to provide the necessary protection against fire long before such fire protection is needed.

The walkway 21 may frequently include telescopical sections 41 and 43 pivotally connecting it to the terminal 23 for pivoting the walkway about a vertical axis. The cabin 25 is typically carried on an self-propelled truck, generally designated 34, and is also pivotable about a vertical axis to accommodate different orientations with respect to the aircraft 27. The open side of the cab 25 normally includes a rectangular door frame, generally designated 47, (FIG. 2) and are formed with either rigid or extendable floors 42 having a fire resistant bumper 44 mounted on the free edge thereof to contact the side of the aircraft and act as a weather and fire seal. The shroud of the present invention generally includes a rectangular shroud frame defining a housing 49 mounted from such cab frame 47.

Conveniently, the shroud apparatus of the present invention includes a pair of top and bottom retaining doors 51 and 53, respectively, pivotally carried from such housing 49 by means of hinges 55 and 57 respectively (FIG. 2). The shroud 23 includes respective top 61, bottom 63 and opposite side sheets 65 and 67 constructed of fire resistant cloth, such as a cloth marketed under the Mark Siltem, by Haveg Industries, 900 Green Bank Road, Wilmington, Del., 19808, to provide a thermal barrier against transfer of heat into the interior of the shroud. In some applications, the sheets 61, 63, 65 and 67 are covered with reflective coatings to provide further protection against heat induction. It will be appreciated that multiple layers of sheets 61, 63, 65 and 67 may be provided if desirable and that such sheets may be of rigid construction for telescoping and pivoting into position against the aircraft.

Referring to FIGS. 2 and 4, the open end of the shroud 33 is formed by a pair of upper and lower horizontally extending flexible pad bars 71 and 73. The upper pad bar 71 has the free extremity of the top sheet 61 wrapped thereabout and the bottom pad bar 73 has the free extremity of the bottom sheet 63 wrapped thereabout. Elastic side cords 75 (FIG. 7), are stretched between the respective opposite ends of such pad bars 71 and 73 and are received within vertical pockets formed in the free extremities of the respective side sheets 65 and 67. Referring to FIG. 4, the upper pad bar 71 is slightly longer than the length of the shroud housing 49, such that it can be flexed to the bowed position shown upon insertion thereof in such housing to thus cause its opposite ends to engage the opposite ends of such housing to frictionally retain such bar in position within the housing until such time as the door 51 is released and opened.

Still referring to FIG. 2, the top and bottom pad bars 71 and 73 are carried on their opposite extremities from the operator 35. Such operator is in the form of a pair of oppositely disposed vertically extending cylinders 81 having their lower rod ends pivotally connected to the frame 49 by means of pivot pins 83 (FIG. 2). The respective upper cylinder ends mount respective brackets 85, which pivotally carry one end of respective scissor arms 87, the opposite extremities of which are carried from the shroud frame 49 by means of pivot pins 91. Also pivotally carried from the brackets 85 are the respective one extremities of carrier arms 93, the opposite extremities of which are pivotally connected to the respective one extremities of the top pad bar 71 by means of pivot pins 95. Coil compression springs within the cylinders 81 urge the operator 35 to its extended position shown in FIG. 2.

The operator 35 also includes a pair of oppositely disposed bottom carrier arms 101, each medially mounted to a support arm 103 by means of a pivot pin 105 and having the bottom pad 73 pivotally carried therefrom by means of a pivot pin 107. The opposite end of the carrier arm 101 is bent off at an angle to form an offset and is connected with an anchoring bracket 111 by means of a coil tension spring 113 to normally bias such arm in a counterclockwise direction about the pivot pin 105. If desirable, the carrier arm 103 may also be pivotally mounted to enable it to be retracted to a position within the frame 49.

Referring to FIGS. 3 and 4, the top shroud frame door 51 is normally held in its closed position by means of a latch, generally designated 121, which is formed on one end with a boss 122 that projects through a bore 123 formed in the frame 49. The latch 121 is formed on its opposite end with heat conductive stem 130 that projects through a bore 131 formed in the free edge of the top door 51 and is formed with enlarged-in-diameter head 133. The boss 122 is formed with a transverse bore which frictionally receives a pin 124 having one end of a cable 125 connected therewith, the opposite end of such cable leading over a pulley 127 (FIG. 4) and then being connected with a handle (not shown) disposed within the grasp of an attendant for manual actuation thereof. The latch 121 is formed centrally with a fusible link 135 which is responsive to a predetermined temperature to melt thus releasing the lower extremity of the top door 51 and upper extremity of the bottom door 53. The bottom door may be latched closed in any well known manner, such as by a latch 121 or may have a latch coupled with such latch 121 and released thereby.

In operation, when the walkway 21 is to be mated with a particular airplane 27 parked in the loading area, it is extended by driving the cab 25 toward the airplane to telescope out the walkway sections 41 and 43. The cab 25 is pivoted to the desired orientation and extended toward the aircraft until the bumper 44 contacts the aircraft below the threshhold of the entryway. The weather resistant mating device 31 may then be extended to seal against the side of the aircraft as shown in FIG. 2. Passengers may then proceed from the terminal through the covered walkway 21 and board the airplane protected from the weather. It will be appreciated that this procedure may be repeated numerous times during any one 24 hour period at heavily used airport terminals, thus causing wear and tear of the weather protective mating device 31 resulting in deterioration thereof and frequently leading to holes or slits being formed therein which may allow the entry of heat and flames in the event of a fire.

However, with the fire protective shroud 33 of the present invention, if, for instance, a fuel spill should take place and ignition thereof result in a fire under the walkway 21 or airplane 27, the attendant may draw on the free end of the release cord 125 to withdraw the release pin 124 from the boss 122 thus releasing the lower extremity of the top door 51 and freeing the upper pad bar 71 for ejection from the retaining frame 49 by the operator 35. In the event the attendant fails to release such pin 124, the heat conductive stem 130 will conduct heat to the fusible link 135 and when it reaches the aforementioned predetermined temperature, it will separate, thus releasing such latch.

Upon release of the latch 121 and opening of the doors 51 and 53, the operator cylinder 81 will be biased upwardly, thus urging the upper end of the upper carrier arm 93 outwardly from the position shown in FIG. 3 to eject the upper pad bar 71 from the housing 49 and carry it outwardly toward the aircraft 27. The pad bar 71 will thus carry the free extremity of the top sheet 61 outwardly toward the aircraft with flex to accommodate the longitudinal contour of the aircraft. Such top pad bar will also draw the upper ends of the side cords 75 outwardly therewith to thus inable the lower carrier arm 101 to be pivoted counterclockwise as viewed in FIG. 3 to thus carry the lower pad bar 73 outwardly toward the aircraft under influence of the biasing spring 113. Consequently, the medial portion of the side cord 75 (FIG. 7) will contact the aircraft and the cords themselves will stretch and flex to accommodate the vertical contour of the aircraft to thus form a high integrity fire seal.

Thus, there will be a protective shroud formed over the exterior of the weather protective mating device 31 and heat from a fire thereunder will be resisted by the fire resistant sheet 63 and side sheets 65 and 67. It will be appreciated that a layer of dormant air is trapped in the area between the bottom sheet 63 and cab floor 42, thus forming an additional thermal barrier against heat transfer upwardly to such floor and consequently to the bumper seal 44 to thus protect such bumper seal from heat and consequent ignition which may result in emission of toxic fumes into the walkway 21. The shroud 33 is designed to protect the interior of the walkway from heat at a temperature of 2000° below the bottom sheet 63 for a minimum period of five minutes to provide adequate time for removal of the passengers from the aircraft prior to raising of the temperature within such walkway above the tolerable level.

It will be appreciated that the operator 35 may be in any satisfactory form for carrying the tubular shaped shroud formed by the sheets 163, 165 and 167 outwardly in covering relationship over the weather protective mating device 31. For instance, such operator may take the form of a covering canopy which is telescopical or pivotally mounted for being drawn outwardly toward the side of the aircraft or may be in the form of an inflatable dual walled structure which may be inflatable to shoot outwardly around the weather protected sealing device 31 for mating with the aircraft.

It will be advisable to periodically test the fire protective shroud 33 of the present invention and after such testing, the operator cylinder 81 may easily and conveniently be retracted downwardly on its piston to fold the scissor arm 87 and carrier arm 93 to the position shown in FIG. 3 while folding the shroud in fan-like fashion within the shroud housing 49 to ready such fire protective shroud for subsequent extension in the event of fire. The top pad bar 71 is flexed to its bowed position shown in FIG. 4 and inserted back within the housing 49 with the opposite ends thereof making light frictional contact with the opposite ends of such housing to thus assist in retaining such bar pad in its retracted position within such housing while the door 51 is being closed. The lower carrier arm 101 will likewise be pivoted clockwise about its pivot pin 105 to retract the lower pad bar 73 and bottom sheet 63 to thus enable the top and bottom retaining doors 51 and 53 to be closed thereon as shown in FIG. 3.

The embodiment of the fire protective walkway apparatus shown in FIG. 8 is similar to that shown in FIG. 1 except that the shroud housing, generally designated 151, is formed on its opposite sides with concave frame members, generally designated 153, which open outwardly away from the cab, generally designated 155 carried from the end of the walkway. The cab 155 incorporates a weather protective sealing device having a canopy incorporating a top roof 159 which must be cleared by the shroud, generally designated 161 upon extension thereof. To facilitate this clearance, an operator, generally designated 163, is provided for manipulating the upper portion of the shroud 161. Such operator 163 is in the form of linkage including a scissor arm 165 pivotally carried at its upper extremity from the frame 153 by means of a pivot pin 166. Such scissor arm pivotally carries from the free extremity thereof, a telescopical scissor arm 167 formed by a cylinder and plunger arrangement which incorporates a coil compression spring urging such telescopic arm to its extended position. Pivotally carried from the free extremity of the telescopical scissor arm 167 is a carrier link 171 having a horizontally extending flexible pad bar 173 pivotally carried from the opposite end thereof. The scissor arm 165 is urged in a counterclockwise direction to its extended position by means of a torsion spring (not shown).

The linkage of the operator 163 is such that upon release of the pad bar 173 from its solid line retained position, the scissor arm 165 will be rotated counterclockwise while the upper end of the carrier link 171 tends to fall outwardly and downwardly from the frame 153 to rotate in a clockwise direction about its lower end. Meanwhile, the telescopical scissor arm 167 telescopes outwardly under the influence of the contained compression spring. This action carries the extending extremity of the upper portion of the shroud 161 outwardly away from the housing 151 to clear the canopy roof 159 and contact the aircraft high on the side contour of its fuselage.

The lower portion of the operator 163 is formed by a carrier arm 181 mounted medially from a pivotal mounting link 183 by means of a pivot pin 185. The mounting link 183 is pivotally mounted on its opposite end from the frame 153. The lower extremity of the carrier arm 181 carries one end of a lower horizontally extending pad bar 187 and the upper end of such carrier arm is connected with the frame 153 by means of a coil tension spring drawing downwardly thereon. The link, arm and spring 191 are arranged in an over-the-center arrangement such that when the link 183 is in its retracted solid line position retracting the lower pad bar 187 back within the frame 153, the spring 191 draws such link 183 in a counterclockwise direction to maintain the arm and link retracted. However, when the bar pad 187 is drawn outwardly from the frame 153, the arm 181 and consequently link 183 will also be drawn outwardly thus rotating such link is a clockwise direction resulting in it moving over center with respect to the spring 191 to carry the pad 187 outwardly and urge it securely against the side of the aircraft.

From the foregoing, it will be appreciated that operation of the shroud device shown in FIG. 8 is substantially the same as that shown in FIG. 1 and that when the retaining doors (not shown) are opened to release the shroud 161, the operator 163 will be operative to carry the upper portion of such shroud 161 outwardly to cover the area around the fuselage entry door. Such outward movement towards the aircraft of the upper portion of the canopy 161 will draw the side sheets of such canopy outwardly toward the aircraft thus drawing the lower bar pad 187 outwardly from its retracted position resulting in the carrier arm 181 being drawn outwardly and the link 183 rotating to its over-the-center position and causing the spring 191 to urge such pad bar 187 against the aircraft.

From the above, it will be appreciated that the fire protective walkway apparatus of the present invention provides means whereby a walkway during regular use may be mated with an aircraft for unloading of passengers without particular attention being made to the security of the seal formed between the walkway and aircraft. However, in the event of fire, the fire protective shroud of the present invention may be released to envelop the area around the aircraft entry door and automatically form a secure seal therewith to protect passengers from flame, heat and smoke. Such shroud affords protection from fire and heat even in configurations where the floor of the walkway itself may be formed with openings and eliminates the necessity of the attendant maneuvering the walkway cab into position for a firm mechanical seal with the aircraft each time the walkway is utilized. Accordingly, the fire protective walkway apparatus of the present invention is not only relatively economical to manufacture, install and use, but affords a high degree of protection.

I claim:

1. Fire protective walkway apparatus of this type including a substantially rigid covered walkway for projecting on one end from a terminal building and having mounted on its opposite extremity a weather protective border mating device, the improvement comprising:
   a fire protective shroud housing for mounting from said walking apparatus outside said border sealing device;
   fire resistant shroud means exteriorly surrounding at least a portion of said mating device and having a retracted position within said housing and an extended position covering at least a portion of said mating device, means connecting on one extremity of said shroud to said frame, connecting the opposite extremity of said shroud being free; and,
   an operator mounted between said shroud frame and such free extremity of said shroud and operative to extend said shroud to said extended position in covering relationship with said sealing device.

2. Fire protective walkway apparatus as set forth in claim 1 wherein said mating device is of the type that includes a floor having a floor seal for sealing against a craft to be loaded and wherein:
   said shroud means includes a fire resistant bottom sheet mounted between said shroud frame and said operator and spaced below said floor seal for extension in covering relationship under said floor seal upon actuation of said operator to form a heat insulative space between said sealing floor and bottom sheet.

3. Fire protective walking apparatus as set forth in claim 1 that includes:
   biasing means urging said operator toward its extended position; and,
   a latch releasably retaining said operator in its retracted position.

4. Fire protective walkway apparatus as defined in claim 1 wherein:
   said shroud means includes a fire resistant bottom sheet connected on one end with said frame for extension in underlying relationship with respect to said mating device and wherein:
   said operator includes extendable means connected with the end of said bottom sheet opposite said one end and operative upon actuation thereof to extend said bottom sheet under said mating device.

5. Fire protective walkway apparatus as defined in claim 1 for mating with an airplane fuselage having arcuate-in-vertical cross sectional contours in the area of said final entry door and wherein:
   said shroud means includes a pair of side sheets, each connected on their respective one ends with said frame and including on their opposite ends vertically extending flexible edge means for conforming to said vertical cross sectional contour.

6. Fire protective walkway apparatus as defined in claim 1 wherein:
   said operator includes a pair of pivot arms pivotally connected on one end to said frame for pivoting between retracted and extended positions and carrying said shroud means on their respective opposite ends and biasing means for urging said pivot arms to their extended positions.

7. Fire protective walkway apparatus as defined in claim 1 wherein:
   said frame includes a pair of vertically extending side members formed with a concave curve facing outwardly away from said walkway.

8. Fire protective walkway apparatus as defined in claim 1 wherein:
   said shroud means includes top, bottom and oppositely disposed side sheets all connected on their respective one ends to said frame and wherein:
   said operator is connected with the ends of said top, bottom, side sheets opposite said respective one ends.

9. Fire protective walkway apparatus as defined in claim 1 wherein:
   said shroud means is in the form of a collapsible tube extendable to cover the top, bottom and sides of said sealing devices, and flexible, horizontally projecting top and bottom pad bars for carrying the top and bottom of the free extremity of said tube.

10. Fire protective walkway apparatus as defined in claim 3 wherein:
    said latch includes temperature responsive actuating means responsive to a selected temperature to release said retainer.

11. Fire protective walkway apparatus as defined in claim 4 wherein:
    said extendable means include a pivot arm pivotally connected to one end to said frame and on its opposite end to said end of said sheet opposite said one end.

12. A fire protective air terminal walkway apparatus for mating with the side of an aircraft around the entry door thereof and comprising:
    a terminal walkway projecting from a terminal for mating on its free extremity with said aircraft around said entry door;
    a shroud housing mounted on the said free extremity of said walkway;
    a fire protective tubular shroud for surrounding the top, bottom and sides of said free extremity and collapsible into said housing, said shroud being extendable to cover said top, bottom and sides of said free extremity and conformable on its free end with such side of said aircraft around said entry door to seal therewith;

operator means carried by said shroud housing operable to selectively extend said tubular tunnel to cover said free extremity of said walkway and to carry said free end thereof into sealing engagement with said side of said aircraft;

and, actuator means retaining said shroud in said housing and selectively operative upon detection of fire to actuate said operator for extension of said shroud to cover said free extremity of said walkway.

* * * * *